US006969333B2

(12) United States Patent
Sayama

(10) Patent No.: US 6,969,333 B2
(45) Date of Patent: Nov. 29, 2005

(54) MOTOR POWER TRAIN AND METHOD OF ASSEMBLING THE SAME

(75) Inventor: Masayuki Sayama, Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 10/241,075

(22) Filed: Sep. 11, 2002

(65) Prior Publication Data

US 2003/0054913 A1 Mar. 20, 2003

(30) Foreign Application Priority Data

Sep. 14, 2001 (JP) .............................. 2001-280535

(51) Int. Cl.[7] .......................... F16H 3/72; F16H 37/08
(52) U.S. Cl. ......................................... 475/5; 475/203
(58) Field of Search .......................... 475/83, 203, 230, 475/231, 233, 243, 5, 223

(56) References Cited

U.S. PATENT DOCUMENTS

| | | | | |
|---|---|---|---|---|
| 1,459,894 A | * | 6/1923 | Irwin .................... 475/203 X |
| 4,679,463 A | * | 7/1987 | Ozaki et al. .................. 475/86 |
| 4,784,016 A | * | 11/1988 | Masuda et al. ............... 74/650 |
| 5,234,091 A | * | 8/1993 | Kobayashi et al. ......... 475/206 |
| 5,385,513 A | * | 1/1995 | Ishii et al. .................. 475/203 |
| 5,791,427 A | * | 8/1998 | Yamaguchi ................. 180/65.3 |
| 6,015,361 A | * | 1/2000 | Yamazaki et al. .......... 475/230 |
| 6,027,422 A | * | 2/2000 | Yamazaki .................... 475/231 |
| 6,413,181 B2 | * | 7/2002 | Okada .................... 475/230 X |
| 6,436,002 B1 | * | 8/2002 | Ishikawa et al. ............. 475/231 |
| 6,460,677 B1 | * | 10/2002 | Roscoe ........................ 475/231 |
| 6,604,359 B2 | * | 8/2003 | Ishii et al. ................... 475/231 |
| 2002/0019284 A1 | * | 2/2002 | Aikawa et al. ............. 475/150 |
| 2002/0049110 A1 | * | 4/2002 | Ishikawa ..................... 475/223 |

FOREIGN PATENT DOCUMENTS

| | | | | |
|---|---|---|---|---|
| JP | 61192948 | * | 6/1986 | ................. 475/230 |
| JP | 61262248 | * | 11/1986 | |
| JP | 09-226394 | | 9/1997 | |

* cited by examiner

*Primary Examiner*—Roger Pang
(74) *Attorney, Agent, or Firm*—Morrison & Foerster LLP

(57) ABSTRACT

A motor power train which includes a reducer for amplifying motor drive torque, a differential device with a clutch mechanism and a differential gear unit to allocate the drive torque to wheels, and a casing for housing them. The reducer includes a first shaft as an input shaft; a second shaft to which the drive torque is transmitted form the first shaft; a first reduction gear set with a first gear on the first shaft and a second gear on the second shaft; and a second reduction gear set with a third gear on the second shaft and a fourth gear provided on the clutch mechanism of the differential device. The fourth gear and a large-diameter portion of the differential gear unit are offset in axial position without overlapping.

20 Claims, 3 Drawing Sheets

US 6,969,333 B2

MOTOR POWER TRAIN AND METHOD OF ASSEMBLING THE SAME

BACKGROUND OF THE INVENTION

1. Field of Invention

The present invention relates to a motor power train, particularly to a power train for an electric motor of an electric vehicle or a four-wheel-drive electric vehicle in which the electric motor is used in combination with an internal combustion engine (a fuel engine), and to a method of assembling the same.

2. Description of Related Art

Japanese Patent Application Laid-Open No. 9 (1997)-226394 discloses a drive system for an electric vehicle, which is composed of an electric motor, a reducer and a differential.

However, in this drive system, a gear on an intermediate shaft and a large-diameter portion of the differential overlap in axial position. A gear fixed to a flange of a differential case with bolts and a differential gear unit also overlap in axial position. This arrangement requires a large distance between the intermediate shaft and the differential, resulting in a large overall size of the drive system with its degraded mountability.

Moreover, in order to assemble this drive system, a gear is set to an output shaft of the electric motor, and then a center distance between the output shaft and the intermediate shaft is adjusted for proper engagement of gears on both shafts. Such assembly is difficult and thereby costly.

SUMMARY OF THE INVENTION

An object of the present invention is to provide a motor power train, which is compact, light-weight, excellent in mountability, easy to assemble and low-cost, and to provide a method of assembling the same.

An aspect of the present invention is a motor power train comprising: a reducer for amplifying drive torque of a motor; a differential device for allocating the drive torque transmitted from the reducer to wheels, including a clutch mechanism and a differential gear unit; and a casing for housing the reducer and the differential device, wherein the reducer includes: a first shaft to which the drive torque is inputted; a second shaft to which the drive torque is transmitted form the first shaft; a first reduction gear set comprising a first gear on the first shaft, and a second gear on the second shaft, engaging with the first gear; and a second reduction gear set comprising a third gear on the second shaft, and a fourth gear provided on the clutch mechanism of the differential device, engaging with the third gear, and wherein the fourth gear and a large-diameter portion of the differential gear unit are offset in axial position without overlapping.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
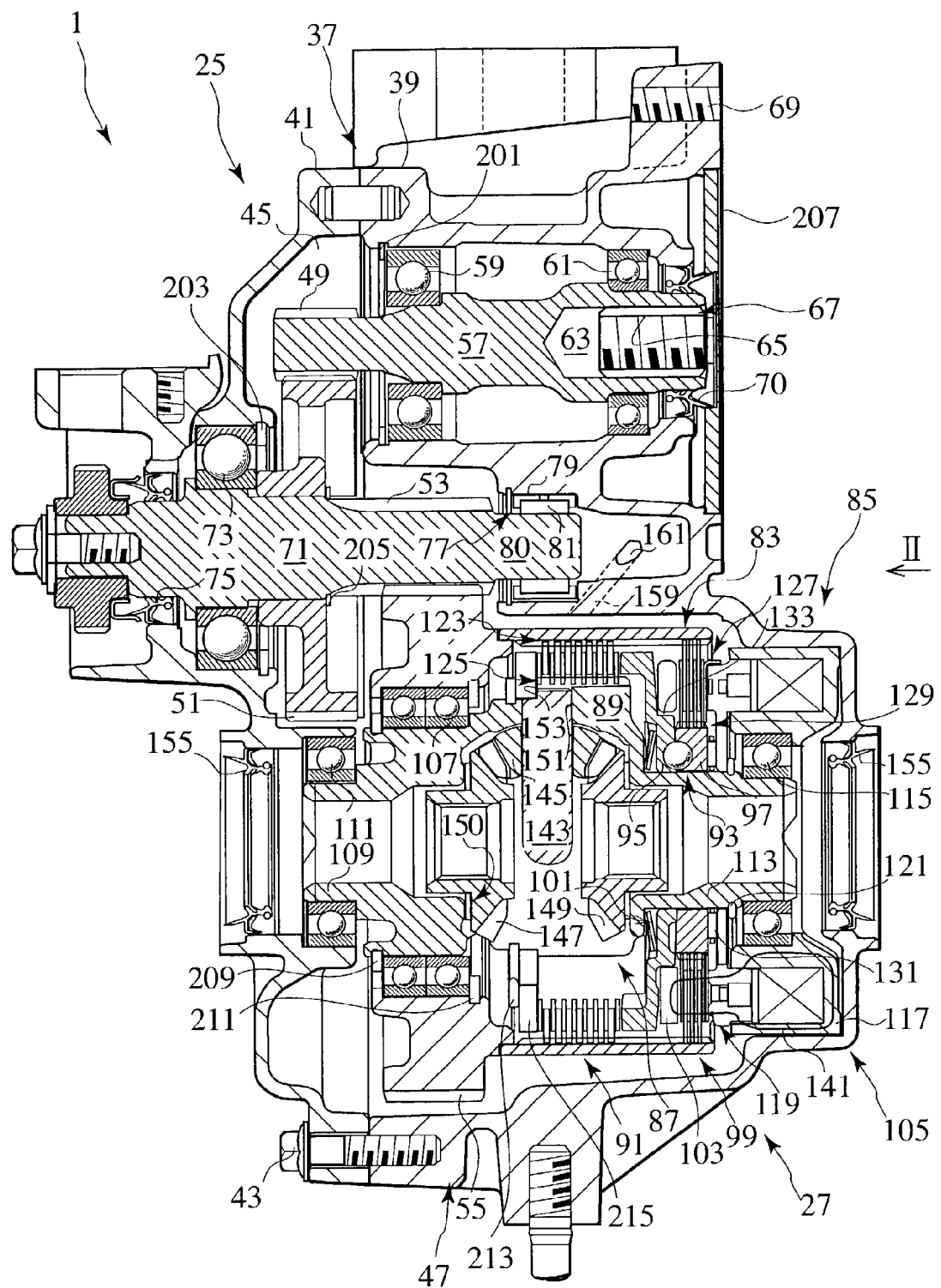
FIG. 1 is a cross-sectional view of a motor power train according to an embodiment of the present invention.

An embodiment of the present invention will be explained below with reference to the drawings, wherein like members are designated by like reference characters.

Figure 3:
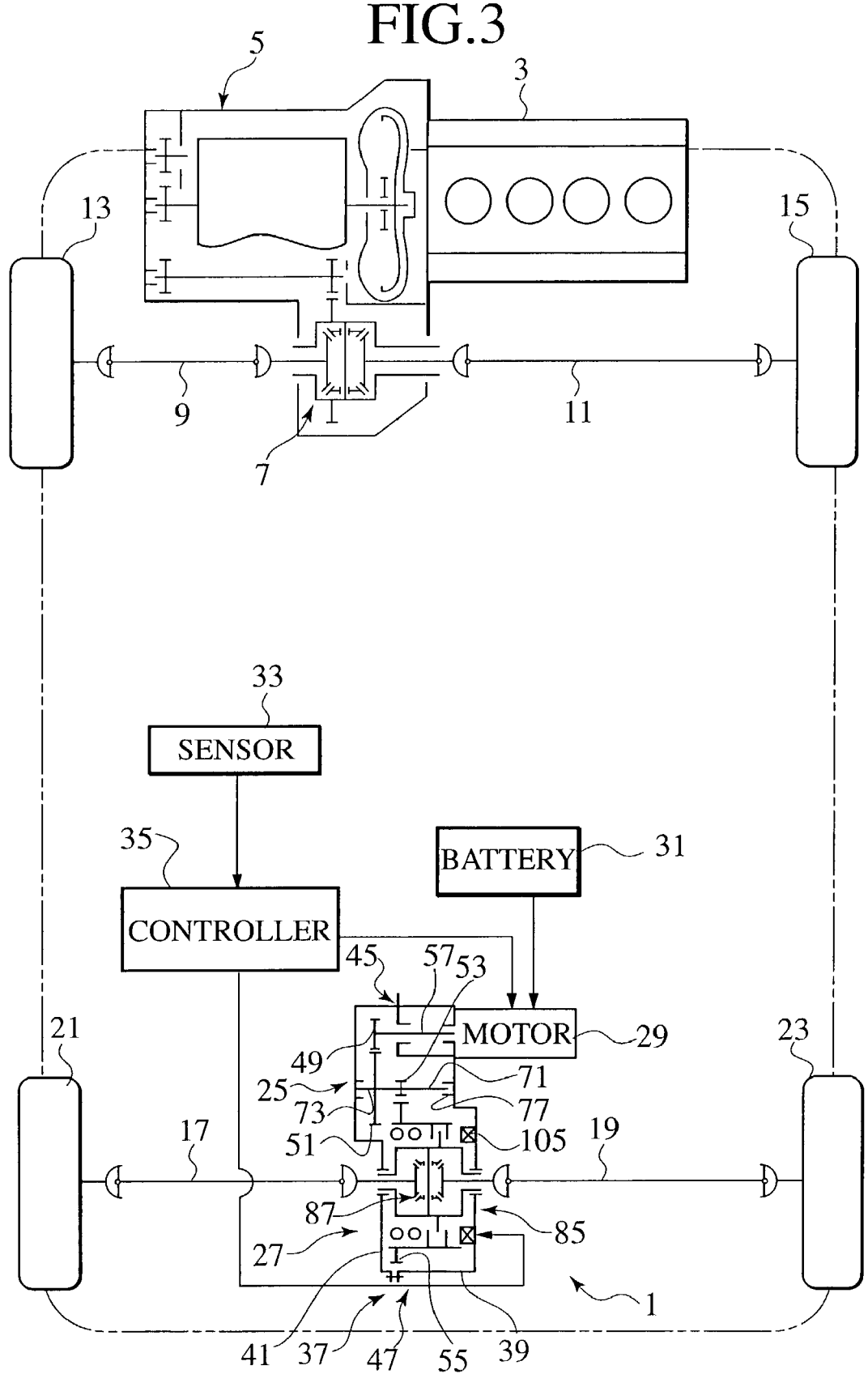
FIG. 3 is an explanatory schematic showing a power system of a four-wheel-drive vehicle using the motor power train of FIG. 1.

In FIGS. 1 and 3, the left side shows a driver's left side (one side in an axial direction) and the right side shows a driver's right side (the other side in the axial direction).

A four-wheel-drive vehicle shown in FIG. 3 is a hybrid electric vehicle which uses both an engine and an electric motor as drive power sources. A front power system on a front wheel side adopts the engine as the drive power source, and a rear power system on a rear wheel side adopts the electric motor as the drive power source. A power train 1 for the electric motor (hereinafter referred to as the power train 1) is applied to the power system on the rear wheel side.

The front power system includes a transverse-type engine 3, a transverse-type transmission 5, a front differential 7 (a differential for allocating drive torque (drive force) from the engine between right and left front wheels), front wheel shafts 9 and 11, right and left front wheels 13 and 15, and the like.

The rear power system includes the power train 1, rear wheel shafts 17 and 19, right and left rear wheels 21 and 23, an electric motor 29, a battery 31, a sensor 33, a controller 35, and the like. The power train 1 includes a reducer 25, a rear differential device 27 having a clutch function (a differential device for allocating drive torque (drive force) from the electric motor between the right and left rear wheels), and the like.

The electric motor 29 is connected to the battery 31 via the controller 35. The controller 35 performs driving of the electric motor 29, adjustment of revolutions, discontinuation of driving, and the like based on information from the sensor 33. In a normal run, the controller 35 discontinues an operation of the rear power system by discontinuing driving of the electric motor 29 and transmission of the drive torque with the rear differential device 27. In this event, the front wheels 13 and 15 are driven by the engine 3. Accordingly, the vehicle shifts to two-wheel drive state driven by the front power system.

When larger drive torque is required for running, the controller 35 drives the electric motor 29 and starts transmission of the drive torque with the rear differential device 27, and thereby operates the rear power system. Accordingly, the rear wheels 21 and 23 are driven accessorily and the vehicle shift to four-wheel drive state.

As shown in FIG. 1, the power train 1 is constituted of the reducer 25, the rear differential device 27, and a casing 37 for housing the foregoing elements.

The casing 37 is constituted of a casing body 39 and a cover 41. The cover 41 is fixed to an opening on a left side of the casing body 39 with a bolt 43. An oil pool is provided on the casing 37.

The reducer 25 includes two stages of a first reduction gear set 45 and a second reduction gear set 47. The first reduction gear set 45 is constituted of a small-diameter gear 49 (a first gear) and a large-diameter gear 51 (a second gear) which are mutually engaged. The second reduction gear set 47 is constituted of a small-diameter gear 53 (a third gear) and a large-diameter gear 55 (a fourth gear) which are mutually engaged.

The small-diameter gear 49 of the first reduction gear set 45 is integrally formed on a left end portion of a first shaft 57 to which a drive torque of the electric motor is transmitted (a torque-transmission shaft on the electric motor side).

This first shaft 57 is borne on the casing body 39 with a pair of ball bearings 59 and 61 disposed on the right and the left of the first shaft 57. The ball bearing 59 on the left side is disposed on a right side of the small-diameter gear 49. A left portion of an outer ring of the bearing 59 is positioned by use of a snap ring 201 retained on the casing body 39. Meanwhile, a right end portion of an inner ring thereof is positioned by the first shaft 57. Moreover, a hub 67 with splines 65 formed inside thereof is welded inside a coaxial hole 63 formed on a right end portion of the first shaft 57.

Figure 2:
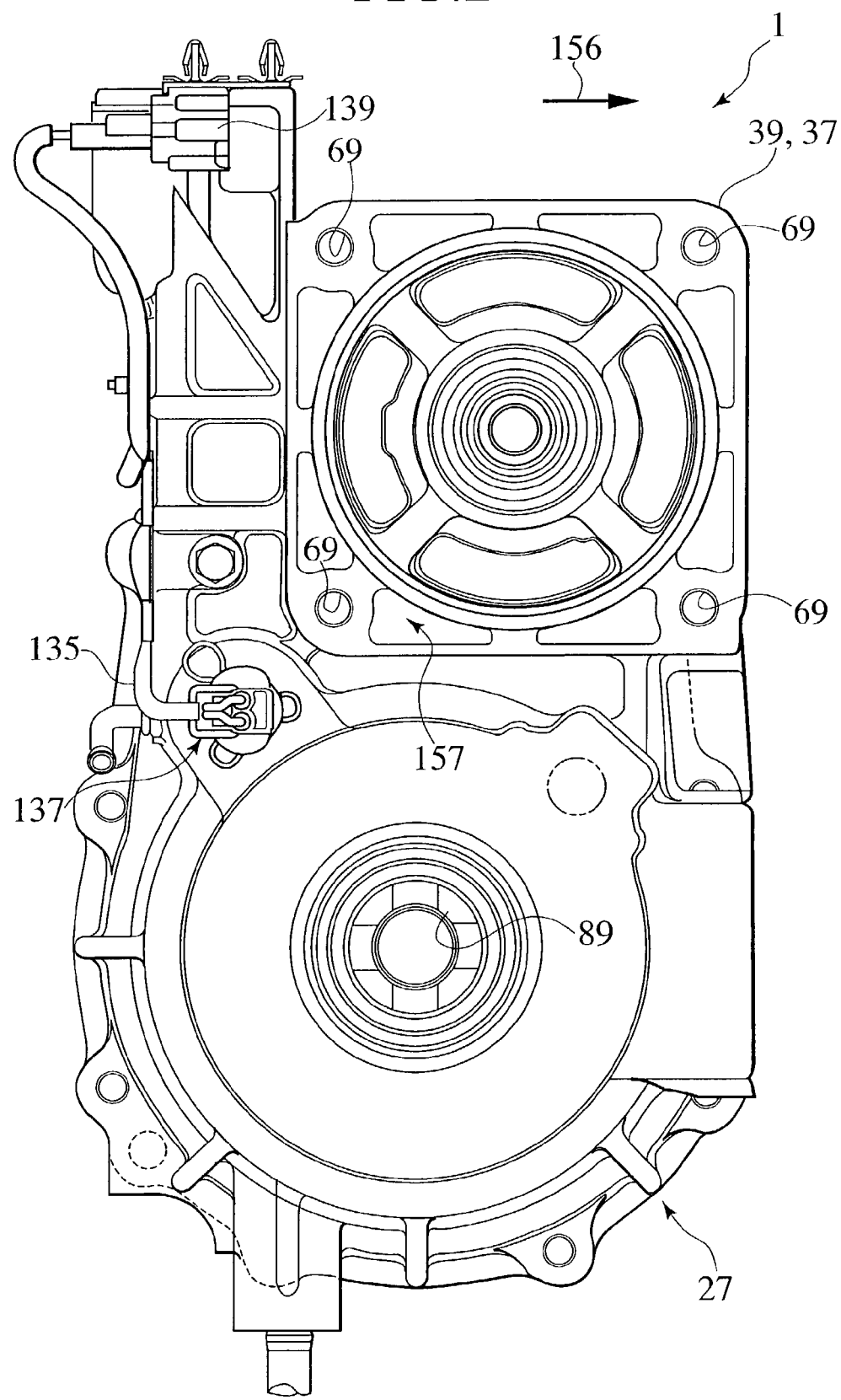
FIG. 2 is a view of the motor power train of FIG. 1, which is taken from a direction of an arrow II.

Moreover, as shown in FIG. 1, the ball bearing 59, the small-diameter gear 53 of a second shaft 71 as an intermediate shaft, and the large-diameter gear 55 of an outer differential case 83 (an outer case) are disposed so as to overlap one another at least partially in axial position. Furthermore, a flange face 207 is provided on the casing body 39 for fitting a motor housing (not shown) of the electric motor 29. As shown in FIG. 2, the electric motor 29 is fixed to the casing body 39 by use of bolts through four screw holes 69 provided on a right side of the casing body 39. The first shaft 57 is joined to an output shaft of the electric motor 29 with the splines 65 on the hub 67.

An oil seal 70 is disposed between the first shaft 57 and the casing body 39 so as to prevent oil leakage to the outside (to the electric motor 29 side). The large-diameter gear 51 of the first reduction gear set 45 is pushed into the second shaft 71, and a right end thereof is positioned by a snap ring 205 retained on the second shaft 71. The large-diameter gear 51 and the large-diameter gear 55 are disposed such that axial projections thereof overlap each other partially.

A left end portion of the second shaft 71 is borne on the cover 41 with a ball bearing 73 interposed therebetween and thereby assembled on the cover 41 (sub-assembled). A right side of the ball bearing 73 is positioned by a snap ring 203 retained on the cover 41 and a left side thereof is positioned by the second shaft 71. An oil seal 75 is provided between the second shaft 71 and the cover 41 so as to prevent oil leakage to the outside. An arrow 157 in FIG. 2 indicates a position of a center of the second shaft 71.

Moreover, a right end portion 80 of the second shaft 71 is borne by the casing body 39 with a roller bearing 77 interposed therebetween. As will be described later, the roller bearing 77 is fitted to the casing body 39 in advance. A retainer portion 79 thereof is fitted into the casing body 39 and a roller portion 81 thereof supports the right end portion 80 of the second shaft 71. The right end portion 80 of the second shaft 71 is inserted into the roller bearing 77 in the event of assembly of the power train 1 by fitting the cover 41 to the casing body 39.

The roller bearing 77 is disposed on a right side of the large-diameter gear 55. Accordingly, the roller bearing 77 and the large-diameter gear 55 are offset without overlapping in axial position.

Moreover, the small-diameter gear 53 of the second reduction gear set 47 is integrally formed on the second shaft 71 and is disposed on a right side of the large-diameter gear 51.

The large-diameter gear 51 and the small-diameter gear 53 of the second shaft 71 are disposed between the bearing 73 supporting the left end portion of the second shaft 71 and the roller bearing 77 supporting the right end portion 80 thereof. Here, the small-diameter gear 53 is disposed on the right of the large-diameter gear 51. In other words, the large-diameter gear 51 and the small-diameter gear 53 of the second shaft 71 and the roller bearing 77 supporting the right end portion 80 are disposed in this enumerating order in a direction from the cover 41 toward the casing body 39. An outer diameter of the small-diameter gear 53 is smaller than an outer diameter of the large-diameter gear 51. An outer diameter of the right end portion 80 is smaller than the outer diameter of the small-diameter gear 53.

Moreover, the large-diameter gear 55 of the second reduction gear set 47 constitutes a ring gear, which is welded on a left end portion of the outer differential case 83 of the rear differential device 27. Here, the large-diameter gear 55 may be integrally formed on the outer differential case 83.

Revolutions of the electric motor 29 are reduced to a range of revolutions of the wheels with drive torque increased and transmitted to the outer differential case 83. Eventually, the outer differential case 83 is rotated so as to rotate the right and left wheels.

The rear differential device 27 includes a clutch mechanism 85 and a differential gear unit 87 of a bevel gear type.

The clutch mechanism 85 includes the outer differential case 83 provided with the large-diameter gear 55 which receives the drive torque of the electric motor to rotate, an inner differential case 89 (an inner case), a multiplate main clutch 91, a ball cam 93, a pressure plate 95, a cam ring 97, multiplate pilot clutch 99, a return spring 101, an armature 103, an electromagnet 105 (an actuator), and the like.

The outer differential case 83 is borne as relatively rotatable on the outside of the inner differential case 89 only by ball bearings 107. In other words, the outer differential case 83 has a floating structure and only performs transmission of the drive torque with the large-diameter gear 55. A left side of these bearings 107 is positioned by a snap ring 209 retained on a left boss portion 109 of the inner differential case 89 and a right side thereof is positioned by a snap ring 211 retained on the large-diameter gear 55.

The large-diameter gear 55 of the second reduction gear set 47 welded on the outer differential case 83 is disposed to be offset to the left from the differential gear unit 87 so as not to overlap a large-diameter portion of the differential gear unit 87 in axial position.

The left boss portion 109 on the left side of the inner differential case 89 is borne on the cover 41 with a ball bearing 111 interposed therebetween, and a right boss portion 113 on the right side is borne on the casing body 39 with a ball bearing 115 and a core 117 of the electromagnet 105 fixed to the casing body 39, interposed between the right boss portion 113 and the casing body 39.

Moreover, as shown in FIG. 1, the small-diameter gear 49 on the first shaft 57, the large-diameter gear 51 on the second shaft 71, and the ball bearing 111 supporting a left end portion of the inner differential case 89 are disposed so as to overlap one another at least partially in axial position.

Moreover, on an outer periphery of the right boss portion 113 of the inner differential case 89, provided is a rotor 119 made of a magnetic material. This rotor 119 is positioned in the axial direction by a snap ring 121 retained on the outer periphery of the right boss portion 113 and thereby constitutes a right sidewall member of the outer differential case 83.

The main clutch 91 is disposed between the outer differential case 83 and the inner differential case 89. Outer plates 123 thereof are joined to splines formed on an inner periphery of the outer differential case 83, and inner plates 125 thereof are joined to splines formed on an outer periphery of the inner differential case 89. A left side of a receiving member 215 disposed on a left side of the main clutch 91 is positioned by a snap ring 213 retained on the outer periphery of the left boss portion 109 of the inner differential case 89, and a right side thereof is positioned by a step portion 153 formed on an end portion of a pinion shaft 143.

The pilot clutch 99 is disposed between the outer differential case 83 and the cam ring 97. Outer plates 127 thereof are joined to the splines formed on the inner periphery of the outer differential case 83, and inner plates 129 thereof are joined to the splines formed on an outer periphery of the cam ring 97.

The ball cam 93 is disposed between the pressure plate 95 and the cam ring 97. The pressure plate 95 is joined to the splines formed on the outer periphery of the inner differential case 89 so as to thrust the main clutch 91 to engage upon receipt of cam thrusting force from the ball cam 93.

Moreover, a thrust bearing 131 is disposed between the cam ring 97 and the rotor 119 for allowing relative revolutions between the cam ring 97 and the rotor 119 while receiving reactive force of the cam thrusting force from the ball cam 93.

The return spring 101 is disposed between the pressure plate 95 and the inner differential case 89 so as to thrust the pressure plate 95 toward the direction for disengaging the main clutch 91.

The armature 103 in a ring shape is disposed as movable in the axial direction between the pressure plate 95 and a rightmost inner plate 129 of the pilot clutch 99. An inner periphery of the armature 103 is supported as relatively rotatable by an outer periphery of a step portion 133 formed on an outer periphery of the pressure plate 95, whereby the armature is centered.

As shown in FIG. 2, a lead wire 135 of the electromagnet 105 is drawn out of the casing body 39 through a grommet 137 and is connected to the battery 31 with a connector 139.

An appropriate gap is provided between the core 117 of the electromagnet 105 and the rotor 119. When the electromagnet 105 is excited, a magnetic path of the electromagnet 105, which is constituted of the gap, the rotor 119, the pilot clutch 99 and the armature 103, and a magnetic flux loop 141 including the magnetic path are generated.

The differential gear unit 87 includes a plurality of pinion shafts 143 and pinion gears 145, side gears 147 and 149, and the like.

The respective pinion shafts 143 are disposed so as to radiate out from the rotation center of the inner differential case 89. An outer end portion of each of the pinion shaft is engaged with an engaging hole 151 of the inner differential case 89. Rotation around the axis thereof is stopped by engagement between the step portion 153 provided on the end portion of the pinion shaft 143 and the receiving member 215 on the left side of the main clutch 91.

The respective pinion gears 145 are borne as rotatable on the respective pinion shafts 143.

The side gears 147 and 149 are respectively engaged with left and right sides of the pinion gears 145. A thrust washer 150 is disposed between each side gear 147 or 149 and the inner differential case 89 so as to receive reactive force attributable to engagement between the side gear 147 or 149 and the pinion gear 145.

The side gears 147 and 149 are respectively joined with splines to the left and right rear wheel shafts 17 and 19. The rear wheel shafts 17 and 19 respectively penetrate the left and right boss portions 109 and 113 of the inner differential case 89, the cover 41 and the casing body 39 and are joined to the left and right rear wheels 21 and 23.

An oil seal 155 is disposed between each of the rear wheel shaft 17 or 19 and the cover 41 as well as the casing body 39, so as to prevent oil leakage to the outside.

Rotation of the inner differential case 89 is allocated between the respective side gears 147 and 149 via the pinion shafts 143 and the pinion gears 145, and further transmitted to the left and right rear wheels 21 and 23 via the rear wheel shafts 17 and 19.

When the vehicle is running on a rough road or the like, a difference occurs between loads on the rear wheels 21 and 23. Accordingly, the pinion gears 145 rotate around the axes thereof. In this way, the drive torque of the electric motor is differently allocated between the left and right rear wheels 21 and 23.

The controller 35 controls a current to the electromagnet 105 including excitation or discontinuation of excitation in response to running and steering conditions of the vehicle including road conditions, starting, acceleration, turning, and the like.

The excitation of the electromagnet 105 is carried out simultaneously with initiation of rotation of the electric motor 29, and the discontinuation of excitation of the electromagnet 105 is carried out simultaneously with termination of rotation of the electric motor 29.

The magnetic flux loop 141 is generated when the electromagnet 105 is excited. Accordingly, the outer plates 127 and the inner plates 129 are engaged between the armature 103 pulled by the magnetic flux loop 141 and the rotor 119, whereby the pilot clutch 99 is engaged. In this way, pilot torque is transmitted to the cam ring 97, which is joined to the outer differential case 83 via the pilot clutch 99.

The pilot torque transmitted to the cam ring 97 is converted into thrusting force which is amplified by the ball cam 93. The pressure plate 95 receives this thrusting force and moves leftward to engage the main clutch 91.

When the clutch mechanism 85 is joined accordingly, the drive torque of the electric motor 29 transmitted to the outer differential case 83 via the large-diameter gear 55 is further transmitted to the inner differential case 89. The drive torque is allocated between the left and right rear wheels 21 and 23 by the differential gear unit 87 as described above. In this event, the vehicle shifts to four-wheel drive state.

If the exciting current of the electromagnet 105 is controlled, then a slip ratio of the pilot clutch 99, i.e. cam-thrusting force of the ball cam 93 is controlled accordingly. In this way, the drive torque to be transmitted to the rear wheels 21 and 23 is controlled.

Such control of the drive torque substantially improves, especially when the vehicle is turning, turning characteristics and stability of the vehicle.

When the excitation of the electromagnetic 105 is discontinued, then the pilot clutch 99 is disengaged and the cam-thrusting force of the ball cam 93 disappears. Then, the pressure plate 95 is pushed rightward by the return spring 101, whereby the main clutch 91 is disengaged. In this way, the clutch mechanism 85 is disengaged and the vehicle shifts to front two-wheel drive state.

When the clutch mechanism 85 is disengaged simultaneously with discontinuation of the electric motor 29, components of the reducer 25 including the large-diameter gear 55 of the outer differential case 83 and the electric motor 29 become free from the rotation of the rear wheels 21 and 23.

In other words, when the vehicle is in the two-wheel drive state, the reducer 25 and the electric motor 29 are not forced to rotate by the rear wheels 21 and 23. Accordingly, durability of the reducer 25 and the electric motor 29 is improved.

Rotating large-diameter gear 51 of the first reduction gear set 45 scatters oil in the oil pool formed at the lower portion of the casing 37 (an arrow 156 in FIG. 2 indicates lower side), whereby respective engaging portions of the gears 49, 51, 53 and 55, the bearings 59, 61, 73 and 77 and the bearings 107, 111 and 115 are lubricated and cooled down.

The scattered oil further permeates to the inside from gaps on both right and left sides of the outer differential case 83 and the inner differential case 89, whereby the pilot clutch 99, a sliding face (face of the step portion 133) between the armature 103 and the pressure plate 95, the ball cam 93, the thrust bearing 131, the main clutch 91 and the like are lubricated and cooled down.

Furthermore, the scattered oil permeates into the inside from spiral oil grooves formed on the inside of the boss portions 109 and 113 when the inner differential case 89 rotates, whereby respective engaging portions of the gears 145, 147 and 149 of the differential gear unit 87 and the like are lubricated and cooled down. Receiving centrifugal force, the oil further moves toward the main clutch 91. In this way, the main clutch 91, the call cam 93, the pilot clutch 99 and the like are lubricated and cooled down.

Thereafter, the oil returns to the oil pool.

Moreover, an oil passage 159 is provided on the casing body 39 for guiding the oil scattered by the rotating large-diameter gear 55 and thereby supplying the oil from an opening 161 to the roller bearing 77. Accordingly, the roller bearing 77 and the like are lubricated and cooled down.

In this power train 1, the left end portion of the second shaft 71 is supported by the cover 41. Accordingly, it is possible to shorten a center distance between the second shaft 71 and the outer differential case 83 of the rear differential device 27. Therefore, the power train 1 can be compact with improved mountability.

Moreover, it is possible to fit the second shaft 71 to the cover 41 in advance before the cover 41 is set on the casing body 39. Setting of the second shaft 71 is completed upon setting the cover 41 on the casing body 39 with the right end portion 80 of the sub-assembled second shaft 71 inserted into the roller bearing 77 set in the casing body 39 in advance.

Moreover, since the roller bearing 77 is used as the bearing for supporting the right end portion 80 of the second shaft 71, it is easier to insert the right end portion 80 of the second shaft 71 in the event of setting the cover 41 on the casing body 39 together with the second shaft 71.

Moreover, the portions of the second shaft 71, namely, the large-diameter gear 51, the small-diameter gear 53, and the right end portion 80 to be supported by the roller bearing 77 are disposed in the enumerating order in the direction from the cover 41 toward the casing body 39. In addition, the outer diameter of this right end portion 80 is smaller than the outer diameter of the small-diameter gear 53. Therefore, the second shaft 71 and the casing body 39 do not interfere with each other upon setting the cover 41 on the casing body 39.

Therefore, assembly of the power train 1 is made easier and assembly costs are thereby reduced.

Moreover, since the both end portions of the second shaft 71 are supported by the bearings 73 and 77, the second shaft 71 is not inclined, obtaining stable engagement of the large-diameter gear 51 and the small-diameter gear 53 disposed between the bearings 73 and 77.

In this power train 1, the large-diameter gear 55 and the large-diameter portion of the differential gear unit 87 are offset without overlapping in axial position. This arrangement makes it possible to shorten a center distance between the second shaft 71 and the outer differential case 83 of the rear differential device 27.

Moreover, the roller bearing 77 is disposed on the right side of the large-diameter gear 55 and those elements are offset without overlapping in axial position. This arrangement makes it possible to shorten the center distance between the second shaft 71 and the outer differential case 83 of the rear differential device 27.

Moreover, the small-diameter gear 49 of the first shaft 57, the large-diameter gear 51 of the second shaft 71 and the ball bearing 111 for supporting the left end portion of the inner differential case 89 are disposed so as to mutually overlap in axial position. The ball bearing 59 for supporting the first shaft 57, the small-diameter gear 53 of the second shaft 71 and the large-diameter gear 55 on the outer differential case 83 are disposed so as to mutually overlap in axial position. Accordingly, center distances among the first shaft 57, the second shaft 71 and the inner differential case 89 (or the outer differential case 83) are respectively shortened.

Moreover, the large-diameter gears 51 and 55 are disposed so as to mutually overlap in axial position. Accordingly, a center distance between the second shaft 71 and the outer differential case 83 of the rear differential device 27 is shortened.

Moreover, since the large-diameter gear 55 is integrally formed (welded or machined) on the outer differential case 83, the outer diameter of the large-diameter gear 55 is reduced.

Accordingly, the power train 1 is made compact with its improved mountability.

In the power train 1, the first shaft 57, the second shaft 71 and the inner differential case 89 are accommodated in the casing 37. Accordingly, assembling of the power train 1 is made only by setting the reducer 25 and the rear differential device 27 in the casing 37 with the electric motor 29 separated. Therefore, assembly is made easier and the assembly costs are thereby reduced.

In the power train 1, the constituents except the electric motor 29 (which include the reducer 25, the rear differential device 27 and the like) are integrally set inside the casing 37 to form a sub-unit. Such a sub-unit can be used irrespective of a motor housing of the electric motor 29. Accordingly, freedom of mountability onto the vehicle is improved.

Moreover, regarding the rear differential device 27, the clutch mechanism 85 is built in the outer differential case 83. Accordingly, the rear differential device 27 is made compact and light-weight, whereby mountability thereof is improved.

Moreover, it is not necessary to especially design and fabricate the output shaft of the electric motor 29 or the casing 37 in dependence to the type of the electric motor for use, saving cost attributable thereto.

The invention may be practiced or embodied in still other ways without departing from the spirit or essential character thereof.

Although the foregoing embodiment has been described as an example of application to an electric vehicle in which the engine is used as a main drive power source and the electric motor is used as an auxiliary drive power source, the power train for an electric motor according to the present invention is also applicable to a vehicle which uses an electric motor as a main drive power source thereof.

Moreover, the differential device in the present invention is not limited to the one with the differential of the bevel gear type as described in the embodiment, but also various types of differentials are applicable such as a differential of a planetary gear type, a differential in which a side gear of an output side is joined by a pinion gear housed slidably in a housing hole of a differential case, or a differential using a worm gear.

In the present invention, the torque-transmission shaft on the electric motor side is not limited to an input shaft to which the output shaft of the electric motor is directly joined as described above. Instead, the torque-transmission shaft may be also designed as a torque-transmission shaft on a rear stage of a reduction gear set joined to the input shaft.

Moreover, the intermediate shaft includes all shafts disposed between the torque-transmission shaft on the electric motor side (or the above-mentioned input shaft) and the differential case of the differential device. In other words, the intermediate shaft should not be limited to only one shaft, but multiple intermediate shafts are also applicable.

Therefore, the number of sets of shafts from the input shaft directly joined to the electric motor to the differential case (a shaft at the last stage) of the differential device may be variable.

For example, in a model having five stages from the input shaft to the differential case, it is possible to use the input shaft as the torque-transmission shaft on the electric motor side and to use three other shafts between the input shaft and the differential case as the intermediate shafts. Otherwise, it is also possible to use the third shaft from the input shaft as the torque-transmission shaft on the electric motor side and to use one shaft remaining between the torque-transmission shaft and the differential case as the intermediate shaft.

As described above, if the number of sets of the shafts (the number of stages of the reduction gear sets) is increased more, then a larger speed reducing function (a torque amplifying function) is obtainable. In addition, loads on the respective reduction gear sets are reduced. Accordingly, durability of the reduction gear sets is improved.

The preferred embodiment described herein is therefore illustrative and not restrictive, the scope of the invention being indicated by the claims and all variations which come within the meaning of claims are intended to be embraced therein.

The present disclosure relates to subject matter contained in Japanese Patent Application No. 2001-280535, filed on Sep. 14, 2001, the disclosure of which is expressly incorporated herein by reference in its entirety.

What is claimed is:

1. An axle drive system comprising:
    a drive motor;
    a reducer including a ring gear rotatable about a rotation axis parallel to an output shaft of the drive motor;
    a differential including a differential case rotatable about the rotation axis of the ring gear relative to the ring gear; and
    a clutch for connecting the ring gear to the differential case, wherein the ring gear has a radially innermost part located at a position on a radially inner side of a radially outermost part of the differential case.

2. The axle drive system according to claim 1, wherein the ring gear of the reducer is provided at an axial position offset from the radially outermost part of the differential case.

3. The axle drive system according to claim 1, wherein the differential case is provided outside thereof with an outer casing member to which the ring gear of the reducer is fixed, wherein the clutch is disposed between the outer casing member and the differential case.

4. The axle drive system according to claim 1, further comprising:
    a casing for housing the reducer, the differential and the clutch, the casing being divided into a first part and a second part, wherein at least one of the differential case and a shaft of the reducer is rotatably supported at one end thereof by the first part of the casing and at the other end thereof by the second part of the casing.

5. The axle drive system according to claim 1, wherein the reducer comprises:
    a first shaft coaxially coupled to the output shaft of the drive motor;
    a second shaft disposed parallel to the first shaft and interconnected with the first shaft through a first gear provided on the first shaft and second gear provided on the second shaft; and
    a third gear provided on the second shaft, and the ring gear engaging with the third gear.

6. The axle drive system according to claim 5, wherein a bearing for rotatably supporting the second shaft is provided at an axial position offset from the ring gear.

7. The axle drive system according to claim 5, wherein the first gear is provided on a portion of the first shaft on one side of an axial direction of any bearings rotatably supporting the first shaft, and the first gear, the second gear and a bearing for rotatably supporting the differential case on one side of the axial direction overlap partially in axial position.

8. The axle drive system according to claim 7, wherein the third gear, the ring gear and the bearing of the first shaft overlap partially in axial position.

9. The axle drive system according to claim 4, wherein a bearing for rotatably supporting one of the ends of the shaft of the reducer is configured to receive the one of the ends of the shaft inserted thereinto while being fitted to one of the first and second parts of the casing.

10. The axle drive system according to claim 9, wherein the bearing comprises a roller bearing.

11. The axle drive system according to claim 5, wherein the second shaft with the second and third gears provided thereon is configured to be insertable in an axial direction thereof into a position between the first shaft and the ring gear.

12. The axle drive system according to claim 11, wherein the third gear is provided on the second shaft on a distal side of the second gear, wherein the third gear is formed to be smaller in outer diameter than the second gear, and a distal end portion of the second shaft is formed to be smaller in outer diameter than the third gear.

13. An axle drive system according to claim 5, wherein the second gear and the ring gear are disposed such that axial projections thereof partially overlap.

14. The axle drive system according to claim 3, wherein the ring gear is integrally formed with the outer casing member.

15. An independent axle drive system adapted to be separated from other vehicle drive systems, comprising:
    an electric drive motor; and
    a power train unit integral with the electric drive motor comprising:
    a reducer including a plurality of gears whose rotation axes are parallel to one another;
    a differential including a differential case rotatable about the rotation axis of one of the gears relative to the one of the gears;
    a clutch for connecting the one of the gears to the differential case;
    a casing for housing the reducer, the differential, and the clutch, to which the electric drive motor is mounted on with its output shaft coaxially connected to a shaft of one of the other gears of the reducer; and
    a cam mechanism disposed in an axial position outside side gears of the differential.

16. The independent axle drive system according to claim 15, wherein the casing comprises a casing body and a cover fitted to the casing body.

17. The independent axle drive system according to claim 15, wherein the reducer comprises:
a first shaft to which the output shaft of the electric drive motor is connected;
a second shaft disposed parallel to first shaft and interconnected with the first shaft through a first gear provided on the first shaft and a second gear provided on the second shaft; and
a third gear provided on the second shaft, and a fourth gear constituting the one of the gears to be connected by the clutch to the differential case and engaging with the third gear, wherein the fourth gear is disposed in an axial position between the second gear and the clutch.

18. The independent axle drive system according to claim 15, further comprising an actuator for engaging and disengaging the clutch, using an electromagnet fixed inside the casing.

19. A vehicle comprising:
an independent axle drive system adapted to be separated from other vehicle drive systems comprising,
an electric drive motor; and
a power train unit integral with the electric drive motor comprising,
a reducer including a plurality of gears whose rotation axes are parallel to one another;
a differential including a differential case rotatable about the rotation axis of one of the gears relative to the one of the gears;
a clutch for connecting the one of the gears to the differential case;
a casing for housing the reducer, the differential, and the clutch, to which the electric drive motor is mounted on with its output shaft coaxially connected to a shaft of one of the other gears of the reducer; and
a cam mechanism disposed in an axial position outside side gears of the differential.

20. The vehicle according to claim 19, comprising another axle drive system using power generated by an internal combustion engine.

* * * * *